April 14, 1959 R. O. SPRECHER 2,881,536
MEANS FOR DEMONSTRATING OPTICAL REFRACTION
Filed March 21, 1958 2 Sheets-Sheet 1

INVENTOR
Roland O. Sprecher

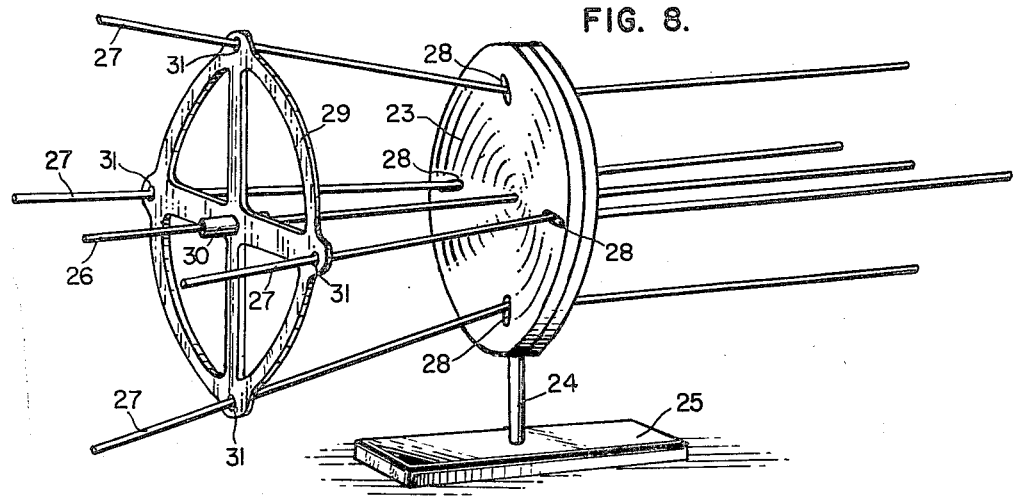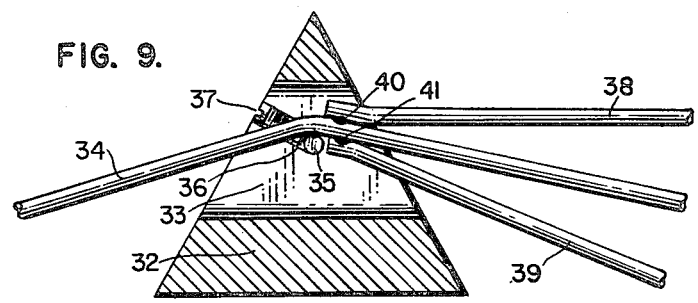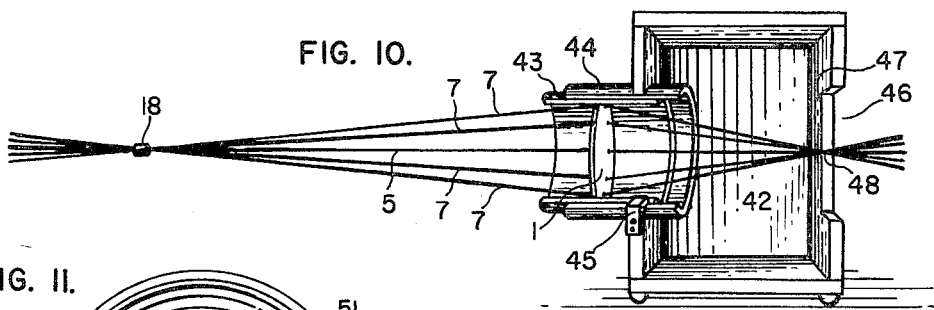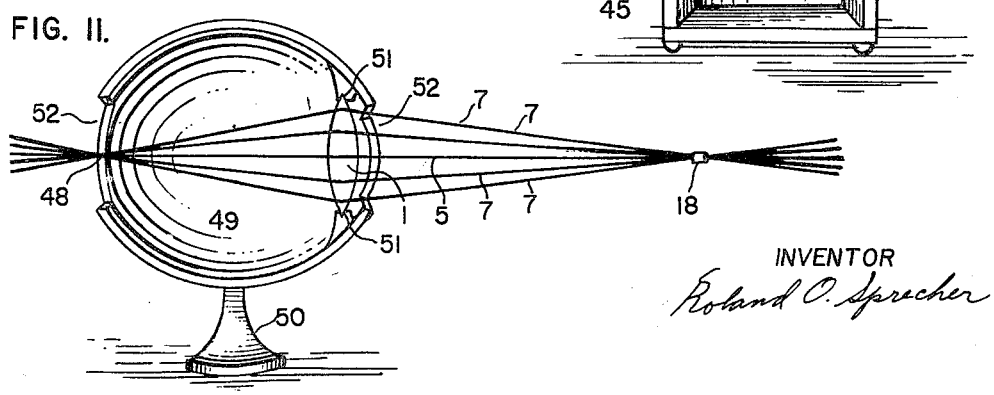
INVENTOR
Roland O. Sprecher

United States Patent Office 2,881,536
Patented Apr. 14, 1959

2,881,536

MEANS FOR DEMONSTRATING OPTICAL REFRACTION

Roland Otto Sprecher, Madison, Wis.

Application March 21, 1958, Serial No. 722,992

13 Claims. (Cl. 35—19)

This invention relates generally to demonstrating devices, and, more particularly, to such devices for use by teachers, salesmen and others, and in educational and commercial displays, for the purpose of explaining and demonstrating the principles of refraction and dispersion of light rays by various optical devices and instruments.

A common difficulty encountered in the process of teaching or demonstrating the principles of refraction and dispersion of light by such optical devices as lenses, prisms and the like is that actual light rays are invisible to the observer, so that their paths through optical media cannot be seen directly. Consequently, teachers and other demonstrators commonly resort to the use of the diagrams to aid in explaining refraction phenomena, but the effectiveness of diagrams is limited by the facts that they are two-dimensional and static, being incapable of the movements and adjustments required to kinematically show how the patterns of refracted light rays emerging from an optical device change in response to changes in the angles of incidence of incident light rays.

The object of my invention is to overcome the difficulties described by, first, providing three-dimensional mechanical analogue models of optical devices in which light rays are represented by thin, stiff rectilinear wires or rods which pierce the said models through suitable apertures so as to protrude from opposite surfaces thereof and be clearly visible to the observer; second, representing each refracted light ray as being mechanically analogous to a bent lever, which, in the models described, is provided by angularly bending a representative wire or rod of the above-mentioned type to form a large obtuse angle at its point of passage through an aperture in said model so as to represent refraction, and pivotally mounting said wire or rod therein so as to allow its oscillation in the plane of refraction, the two arms of the lever thus formed representing, respectively, the incident and refracted portions of a light ray, so that corresponding changes in angles of incidence and refraction of a light ray may be demonstrated by manually oscillating the said lever; third, providing, through suitable combinations and designs of the components described, three-dimensional and adjustable optical refraction models which incorporate this mechanical, bent-lever analogy and are capable of visually demonstrating such optical phenomena as light ray patterns in image formation by lenses, the relationship between object distance and image distance in image formation, focusing, dispersion, lens aberrations and the like; and, fourth, providing mechanical analogue models of the type described to represent such specific optical devices as positive and negative lenses, prisms, eyes, cameras and other optical instruments, and the like, and to demonstrate their optical principles.

With these and other objects in view, the invention comprises the novel features and combinations of elements as illustrated in the accompanying drawings and set forth in the following specification and claims.

In the drawings:

Fig. 8 is a perspective view of a second form of the invention, a demonstration model of a negative lens, which is constructed and operated in a manner similar to the model of Fig. 1.

Fig. 9 is a vertical cross section through a third form of the invention, an optical prism model incorporating wire rays to demonstrate dispersion of light rays.

Fig. 10 shows, diagrammatically, a lens model of the type illustrated in Fig. 1 mounted in a model of a vertical longitudinal section through a camera, the camera itself being shown in perspective.

Fig. 11 shows, diagrammatically, a lens model of the type illustrated in Fig. 1 mounted in a model of a vertical longitudinal section through an eyeball, the eyeball itself being shown in perspective.

Figure 1:
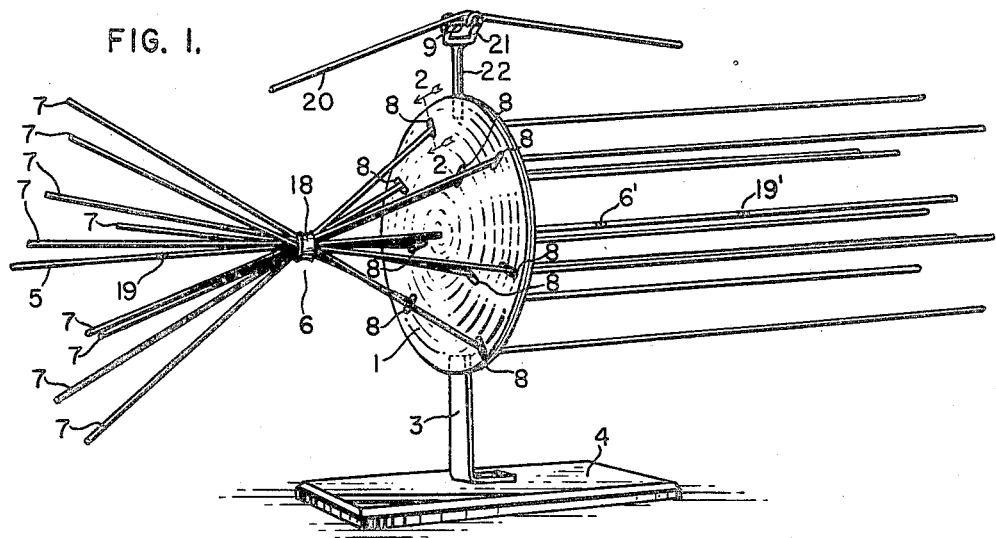
Fig. 1 is a perspective view of one form of the invention, comprising a model of a positive lens, pierced by a plurality of bent wire levers, hereinafter referred to as "wire rays," which represent light rays passing through the lens.

Referring more in detail to Fig. 1 in the drawings, a positive optical lens 1, preferably of double convex design, is mounted by means of a mating recess in its bottom edge upon a vertical support 3, which is secured to a suitable base 4. The dimensions of the lens and its supporting parts are not critical. The lens 1 may be either an actual optical lens or a suitably shaped representative model thereof, machined or molded from any suitable material, such as metal, wood, plastics or the like.

A thin, straight wire or rod 5 of suitable length, generally of the order of two to ten times the lens diameter, pierces the center of the lens 1, immovably fixed thereto by a press fit or other suitable means and so disposed as to pass through the principal foci of the lens and protrude substantially from opposite surfaces of said lens. The wire 5 represents the principal optical axis of the lens, and, as with all wires used in the devices described herein, it must be sufficiently stiff to remain straight despite its own weight. A convenient length, generally of the order of one to three times the lens diameter, is chosen for the focal length of the model lens, and the principal foci 6, 6' are located and marked with paint or other suitable means, on the axis wire 5, each at the distance of the chosen focal length from the center of the lens.

Figure 2:
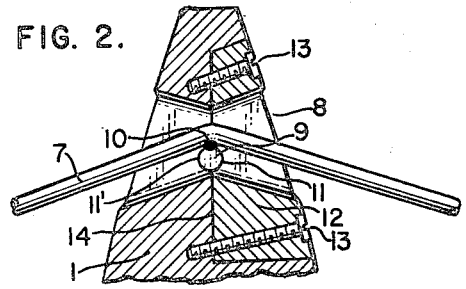
Figs. 2 and 3 are radial cross sections through a portion of the lens on the line 2—2 in Fig. 1, illustrating two alternative methods of pivotally mounting each wire ray within the lens.
Figure 3:
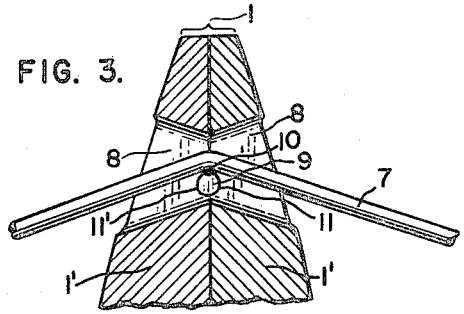
Figure 4:
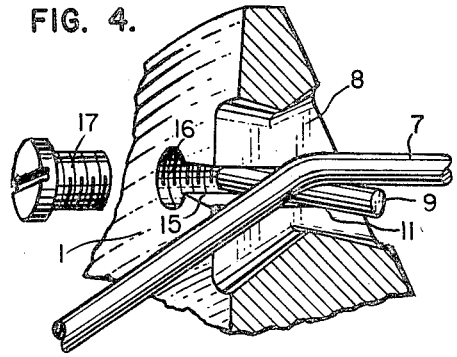
Fig. 4 is a section similar to Figs. 2 and 3, but viewed in perspective from the same viewpoint as used in Fig. 1, illustrating a third method of mounting each ray.

The wire rays 7 are constructed of thin, stiff rectilinear wires, each substantially the same length as the axis wire 5. Each of said wire rays is angularly bent, so as to represent refraction, at a point at which it passes through one of the rectilinear ray slots 8 in the lens 1, the long axes of said ray slots coinciding with radii from the center of said lens. A short wire pivot 9, Figs. 2, 3 and 4, is welded at 10, perpendicularly, to each wire ray 7 at the point of its refractive bend, said pivot being pivotally retained in the bearing 11, 11' within the lens, thus allowing each wire ray to oscillate about the point of its refractive bend with a simple lever motion in a plane of the optical axis wire 5. The ray slots 8 must be slightly wider than the diameter of the wire rays to permit free oscillation of the latter.

One means of providing a bearing for retaining each pivot 9 is illustrated in Fig. 2. A portion of the lens 1 at the site of each ray slot 8 consists of a removable block or insert 12, held in place by the screws 13 and so shaped that its exposed surface is contiguous and in conformity with the lens surface so as to form a portion of said surface, and its opposite, or innermost, plane surface mates with a plane surface 14 within the lens at the central plane thereof. Half of the ray slot 8 is incorporated in the insert 12 so as to mate with the other half of the slot 8 in the body of the lens, and a semi-cylindrical rectilinear groove 11 in the plane surface of the insert 12 mates with a similar groove 11' in the plane surface 14 within the body of the lens so as to form a cylindrical bearing for the pivot 9.

An alternative means of providing pivot bearings consists of bilaterally fabricating the entire lens of two mating halves 1', 1', as in Fig. 3. Half of each ray slot 8 is cut through each half of the lens, and semicylindrical grooves 11 and 11' are cut into the mating, plane surfaces of said lens halves, intersecting their respective ray slots 8 perpendicularly and mating with each other when the said lens halves are assembled so as to form a cylindrical bearing for the ray pivot 9. The lens halves 1', 1' may be joined to each other with a suitable cement, so that no evidence of bearing construction is exposed to view. The lens model shown in Fig. 1 is constructed in this fashion.

In a third alternative, Fig. 4, the lens 1 is fabricated as a single body, the required ray slots 8 perforating the lens in the desired locations. A deep rectilinear groove 15, one half of which is shown in this section view, is cut into said lens, perpendicular to each ray slot 8, and extending from the surface of said lens to such depth therein that the ray pivot 9 may be inserted into the groove 15 so as to rest against the bottom extremity thereof with its axis lying in the median plane of the lens and perpendicular to the optical axis thereof. Each end of the bearing groove 15 terminates in the threaded hole 16, wherein a setscrew 17 serves to hold one end of the pivot 9 in place.

After all wires have been assembled in the lens, the wire rays 7 are gathered together at one extremity of the axis wire 5, Fig. 1, and the focus ring 18 is slipped over the resulting bundle. The ring 18 must be a snug fit, but elastic and capable of being slid manually, longitudinally along the axis wire 5, thus moving the point of convergence of the wire rays to any desired point thereon, each of said wire rays pivoting, lever-wise, in a plane of the optical axis as this action is carried out. The exact refractive angle of each wire ray 7 is adjusted by bending it at its pivot point, as required, so that all arms of the wire rays 7 emerging from one surface of the lens 1 will be parallel to the axis wire 5 when the opposite arms of said wire rays are held at a point of convergence at the principal focus 6 by the focus ring 18, as illustrated in Fig. 1.

Figure 5:
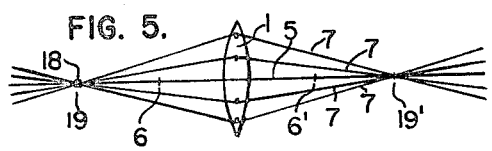
Figs. 5, 6 and 7 are diagrams of typical ray patterns obtainable by suitable manipulation of the model shown in Fig. 1.

The conjugate foci locations 19, 19' are determined by manually sliding the ring 18 to a point approximately twice the focal distance from the left surface of the lens as shown in Fig. 1, whereupon all wire rays 7 will rotate on their pivots within the lens 1, acting as bent levers, so as to converge at a corresponding point about the axis wire 5 to the right of the lens. Adjustment of the ring 18 so that said ring and the point of convergence of said wire rays to the right of said lens are equally distant from the center of the lens, as diagrammed in Fig. 5, establishes, respectively, the exact locations of 19 and 19', which are then marked on the axis wire 5. This procedure is necessary because the conjugate foci 19, 19' are not exactly twice the focal distance from the center of the model lens, as would be true with a real lens, due to the fixed angle of refraction of the analogue wire rays 7; this discrepancy is too small to be noticeable to the observer, however, when the conjugate foci 19, 19' are located as described.

It is desirable, though not essential, for the total number of wire rays 7 incorporated in the model to be some multiple of three, since there are three primary colors of light (nine such wire rays are shown in Fig. 1). Each wire ray may then be painted either red, green or violet (three rays of each color where a total of nine rays are used), so that chromatic aberration can be demonstrated by bending the violet rays at their pivots slightly more, and the red wire rays slightly less, than the green rays. The wire rays chosen to be painted each given color should be substantially equi-distant from each other at their points of mounting in the lens. It is also desirable to locate some of the ray slots 8 nearer the axis 5 than others, as shown in Fig. 1, so as to demonstrate the greater angle of refraction near the edge of the lens.

The pivot 9 of a specimen wire ray 20, Fig. 1, is rotatively retained in the clevis 21, the stem 22 of which is inserted, loosely, so as to permit easy removal, into a socket in the top edge of the lens 1.

The operation of the invention is as follows:

The operator, having explained how a light ray is refracted upon passing from one optical medium into another, points out that the specimen wire ray 20 is a mechanical analogue of this phenomenon, and that, for a thin optical device such as a typical lens, it is acceptable to represent the total degree of refraction by a single bend in the wire ray, although in an actual lens it actually occurs as two bends, one at each surface of the lens. The specimen wire ray 20, unlike the wire rays 7, which are restrained by the ring 18, can then be independently oscillated on its pivot 9 to show that the total degree of refraction at a given point in a lens can be considered, for qualitative and descriptive purposes, as remaining constant for all angles of incidence. It should also be explained that the total degree of refraction does not remain precisely constant in this fashion when actual light rays are refracted by actual lenses, but that the analogy is sufficiently close to be useful in understanding refraction phenomena.

Having thus established the analogue principle of the lens model, the operator points out that all of the wire rays 7 operate in the same manner as the specimen ray 20, but that their movements are initiated and synchronized by manual sliding of the focus ring 18. The specimen ray 20 is then removed from the lens model for the remainder of the demonstrations.

Figure 6:
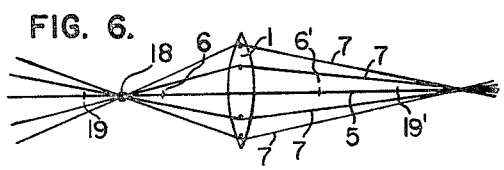
Figure 7:
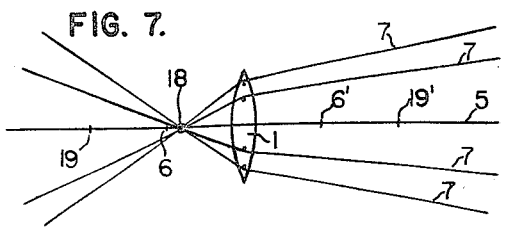

The operator points out that light rays can travel in either direction along the paths traced by the wire rays. Hence, with the focus ring 18 at the principal focus 6, as in Fig. 1, the model represents either parallel rays from a distant object converging at the focus 6, or light originating at 6 being focused into a beam of parallel rays. By sliding the ring 18 to twice the focal length 19 the operator causes all wire rays to pivot so as to converge at 19', as in Fig. 5, in which either point 19 or 19' may be the focus of rays from, and thus the image of, the other. Sliding the ring 18 to any point between the principal focus 6 and twice the focal length 19 causes the opposite arms of the wire rays 7 to converge at some point beyond 19', as in Fig. 6, either point of convergence of said wire rays again representing an image of a point on an object located at the other point of convergence. With the ring 18 representing an object point or source of light, and with said ring located between the principal focus 6 and the lens, the refracted rays diverge and no real image is possible, as in Fig. 7. By repeatedly sliding the ring to and fro throughout its range the operator can stress the relationship between object distance and image distance. Obviously, the ring 18 can be located at any point along the axis wire 5 to represent other ray patterns than the typical cases shown in Figs. 5, 6, and 7.

Chromatic aberration of a lens can be demonstrated by bending the violet colored rays more, and red rays less than the green wire rays, whereupon the violet rays will converge closer to, and the red wire rays farther from the lens than do the green wire rays. After concluding this demonstration all wire rays can be readjusted to coincidence without damage to them, the observer ignoring their colors in all other demonstrations.

Spherical aberration is demonstrated by bending, at their pivot points, the wire rays mounted in those ray slots 8 located near the edge of the lens so as to impart to them an increased angle of refraction, whereupon the wire rays so adjusted will converge nearer the lens than do those wire rays mounted in ray slots nearer the center of the lens.

A second form of the invention is the demonstration lens of the negative type illustrated in Fig. 8. A negative lens or lens model 23, preferably of double concave design, is immovably mounted upon a vertical support 24, which is secured to the base 25. A rectilinear, stiff wire or rod 26 pierces the center of the lens 23, rigidly fastened thereto and so disposed as to coincide with and represent the principal axis thereof, as described for the axis wire 5 in Fig. 1. A plurality of wire rays 27 pass through the ray slots 28 in the lens 23, each of said rays being pivotally mounted within its respective ray slot, all as previously described in detail for the wire rays 7 of Fig. 1, with the single difference that in the present instance the refractive bend of each of said wire rays at its pivot point is in such direction that its extremities diverge from the axis wire 26 in a common plane therewith rather than converging toward the said axis wire.

A thin, light-weight, wheel-shaped control ring 29, the hub 30 of which is slidably mounted upon one arm of said axis wire 26, controls the action of the wire rays 27, each of which is inserted through a suitably disposed, loosely fitting aperture 31 at the periphery of the ring 29, as shown. The outside diameter of the ring 29 must be substantially greater than the distance between any two diametrically opposed ray slots 28.

The model of Fig. 8 is operated by manually sliding the ring 29 longitudinally to and fro along the axis 26. As the ring 29 approaches the lens 23 the divergent angle between the wire rays 27 to the left of the lens in the figure increases, thus causing all of said wire rays to rotate about their pivots so that those portions of said wire rays located to the right of the lens will converge toward the axis wire 26, and vice-versa, thus demonstrating the effect of a negative lens upon incident light rays by means of the same analogy as described for the model of Fig. 1.

A third form of the invention is the demonstration optical prism shown in vertical cross section through its centrally-located ray slot 33 in Fig. 9. A model triangular prism 32 is perforated by a ray slot 33, which is similar to the slots 8 of Figs. 1, 2, 3 and 4 but necessarily larger than the latter in order to accommodate a more complex wire ray system. The wire ray 34 is bent and welded at its point of passage through the center of the ray slot 33 to the pivot 35, which is held in the bearing formed by the bottom extremity of the rectilinear bearing groove 36 by set-screws 37, similar to the fashion previously described for Fig. 4. Two rectilinear wire rays 38 and 39 are fastened, as by welding, at 40 and 41 to the wire ray 34 in the latter's plane of oscillation, each being bent slightly near its point of attachment thereto so as to diverge therefrom at its distal extremity and in the oscillation plane. The wire ray 38 is colored red, the wire ray 39 is violet, and that portion of the wire ray 34 lying between the wire rays 38 and 39 is green, the remainder of the wire ray 34, to the left of the prism in Fig. 9, being white.

In use, the operator explains that the white portion of the wire ray 34 represents an incident beam of white light, which is composed of a mixture of red, green and violet rays, the latter being dispersed by a prism in the pattern displayed by the three colored rays emerging from the model prism as a result of the progressive increase in the index of refraction for the various colors in the visible spectrum from red through green to violet for a given optical medium. Manually raising the white, or incident end of the wire ray 34 results in lowering the three refracted, colored rays, and vice-versa, but for all positions of the wire ray system the refraction and dispersion pattern remains fixed, as shown in the drawing. Obviously, more than the three primary colors of the visible spectrum could be represented in a model of the type described without departing from the spirit of this invention.

A fourth form of the invention is the demonstration camera model illustrated in Fig. 10. The open rectangular box 42 represents one half of a camera which has been vertically sectioned substantially in the plane of its optical axis so as to expose the interior thereof to the observer's view. The focusing mechanism of the model, also constructed to present a sectional view as above, consists of the semi-tubular lens barrel 43, which is coaxially and slidably retained within the mating semi-tubular barrel mount 44 by the retaining strip 45, which, like the barrel mount 44, is rigidly fastened to the box 42. A demonstration lens model 1, together with its wire rays 7, wire axis 5 and focus ring 18, all as described above and illustrated in Fig. 1, is shown diagrammatically in Fig. 10. The said lens 1 is rigidly and coaxially mounted by means of cement, retaining groove or the like in the lens barrel 43. A rectangular notch 46 in the rear, or focal plane wall 47 of the camera box 42 represents the image area and allows freedom of movement to the wire rays at that point.

In using the device, the operator first manually slides the focus ring 18, which represents the location of an object to be photographed, to any desired point along the axis 5, then slides the lens barrel 43 in the opposite direction within the barrel mount 44 until the point of convergence 48 of the wire rays 7 falls within the focal plane 47 of the camera model, where it represents the formation of an image on a photographic film. The "circle of confusion" and other optical phenomena related to lenses may be demonstrated as described above for the model of Fig. 1 and their application to photography can be demonstrated with the aid of this camera model.

The demonstration model of an eyeball illustrated in Fig. 11 is a fifth form of the invention, similar in principle to the model of Fig. 10. A hollow, oblate, himispheroid chamber 49 represents a vertical longitudinal median section of an eyeball, and is rigidly mounted upon a suitable base 50. A demonstration model lens 1, together with its wire rays 7, wire axis 5 and focus ring 18, all as previously described and shown in Fig. 1, is shown diagrammatically in Fig. 11. The lens 1 is supported at its edges by mating grooves 51, 51 within the eyeball model 49, and suitable notches 52, 52 in the front and rear edges of said eyeball model permit free movement of the wire rays 7.

The operator may use the eyeball model to show, by manually sliding the focus ring 18, which represents a point on a visual object, to and fro along the axis wire 5, that there is only one object distance which will cause the point of convergence 48 of the wire rays 7 to occur at the rear or retina surface of the eyeball if the lens of the eye has a fixed focal length, hence the necessity of a flexible lens which can vary its focal length in an eyeball. Defects of vision and certain of the optical principles as demonstrated with the aid of the model of Fig. 1, described above, can be shown with this eyeball model.

It will be appreciated that the lens model of Fig. 1 may, by removing it from its vertical support 3 and also removing the specimen ray 20 and its supporting parts, be used as the lens in other models of the types shown in Figs. 10 and 11. The basic model of Fig. 1 may thus be used as the lens in any number and variety of demonsration optical instrument models by merely constructing the latter of such size and design that suitable grooves, such as the grooves 51, 51 of Fig. 11, or any other convenient and uniform retaining device, such as spring clips and the like, will support the lens model in the proper position. In a similar fashion, other refracting devices incorporating the bent wire lever analogy described above, such as the prism of Fig. 9 or the negative lens of Fig. 8 can be used in a variety of optical instrument models designed to receive them in the proper representative locations.

I claim:

1. A demonstration model capable of visually presenting a three-dimensional, mechanical analogue illustration of the refraction of light rays as they are projected through an optical medium, comprising an optical refracting device such as a lens or prism, or a representative model thereof, said device being perforated by one or more rectilinear ray slots at the point or points at which a light ray or rays are to be shown passing through said optical device, a stiff wire or rod representing a light ray piercing said optical device through each of said slots, protruding from opposite sides of said optical device, angularly bent to represent refraction at a point contained within said ray slot and pivotally mounted within said ray slot at the point of said refractive bend so as to be capable of oscillation as a bent lever in the plane of refraction, opposing arms of said bent-lever wire ray being rectilinear and representing, respectively, an incident light ray and its corresponding refracted ray, the latter varying its refractive angle in response to variations in the angle of incidence in a manner analogous to the oscillation of the said bent lever, and means for simultaneously imparting co-ordinated motion to a multiplicity of such bent-lever wire rays pivotally mounted within a single optical refracting device or model thereof.

2. In an analogue demonstration model as in claim 1, a stiff, rectilinear wire or rod piercing said optical device or model thereof, substantial portions of said wire or rod protruding from opposite sides of said optical device or model so as to represent the optical axis thereof and/or the path of any light ray passing through said optical device or model at such angle of incidence as not to be refracted thereby.

3. In an analogue demonstration model as in claim 1, a thin, stiff wire or rod representing a light ray, said wire or rod being rectilinear throughout its length except for an angular bend to represent refraction at any desired point, at which point the said wire or rod is pivotally mounted upon a vertical support which is adapted to be either attached to said demonstration model at some convenient point thereon or held in the operator's hand for use as a specimen wire ray in demonstrating the analogy between, on the one hand, the oscillation of a bent lever, and on the other hand, the relation between varying angles of incidence and refraction of a refracted light ray.

4. In an analogue demonstration optical device, or model thereof, as in claim 1, one or more cylindrical bearings, each of said bearings retaining, rotatively, a cylindrical wire ray pivot within said optical device or model, and each of said bearings comprising two mating rectilinear semi-cylindrical grooves, one of said grooves being located in the innermost surface of a removable insert which constitutes a substantial portion of the thickness and surface area of said optical device or model in the region of a rectilinear ray slot through which a wire ray pierces said optical device or model, the said insert encompassing said ray slot and the said bearing groove intersecting said ray slot perpendicularly, and the other of said bearing grooves being located, also perpendicularly disposed to the continuation of said ray slot, in the surface which forms the depth extremity of a recess in the body of said optical device or model into which the said insert is received and secured by suitable means.

5. In an analogue demonstration model as in claim 1, said optical device or model thereof being bilaterally constructed by joining together the plane surfaces of two corresponding halves of said device or model at a median plane thereof, slots for receiving wire rays perforating the said device or model, and a rectilinear semi-cylindrical groove intersecting each of said slots perpendicularly in each of said median plane surfaces, said grooves mating at each of said slots to form a cylindrical bearing to receive a wire ray pivot.

6. In an analogue demonstration model as in claim 1, said optical refracting device or model thereof perforated by one or more ray slots through each of which a wire ray is inserted with substantial portions thereof protruding from opposite surfaces of said device or model, each such wire ray being immovably secured, perpendicularly, at a point enclosed within its respective ray slot, to a cylindrical pivot which is rotatively retained in a bearing formed by the bottom extremity of a deep rectilinear groove, said groove intersecting the said ray slot perpendicularly, extending from one surface of said optical device or model into the interior thereof and terminating at a median plane therein, opposing ends of said groove terminating in threaded holes wherein setscrews retain said cylindrical pivot against the depth extremity of said groove.

7. A demonstration model capable of visually presenting a three-dimensional, mechanical analogue illustration of the refraction of light rays as they are projected through an optical medium, comprising a positive, or converging, type optical lens or representative model thereof, vertically mounted at its lower edge upon a vertical support which is fixed to a suitable base; a thin, stiff rectilinear wire or rod piercing the center of said lens or model, rigidly fastened thereto, protruding substantially from opposite surfaces thereof, and so disposed as to coincide with and represent the optical axis of said lens or model, the principal foci and conjugate foci of said lens or model being visibly marked on said axis wire or rod; a plurality of ray slots perforating said lens or model at a variety of distances from and at locations symmetrically disposed, angularly, about said optical axis, the major axes of said ray slots being radially disposed toward said optical axis; a plurality of thin, stiff wire rays, each representing a light ray and projecting through one of said ray slots wherein it is rigidly fastened, perpendicularly, to a cylindrical pivot which is rotatively retained in bearings within the said ray slot so as to permit oscillation of said wire ray as a lever in a plane of said optical axis, each of said wire rays protruding substantially from opposite surfaces of said lens or model and each being rectilinear throughout its length except for an angular bend to represent refraction at its point of attachment to said pivot, said angular bend being so directed that opposing lever arms of said wire ray converge toward said optical axis, and the said angular bend being of such degree that one arm of said wire ray will be parallel to said optical axis if the opposing arm of said wire ray intersects said optical axis at the principal focus of said lens or model; and a flexible, elastic focus ring surrounding and retaining all wire ray arms beyond one surface of said lens or model in a bundle at their point of convergence about and in contact with said optical axis wire, the said focus ring representing a focus of light rays and capable of being manually slid longitudinally along said axis wire so as to serve as a control means for simultaneously and coordinately oscillating all of said wire rays as levers to demonstrate visually the light ray patterns developed in the process of image formation by a positive lens.

8. In an analogue demonstration model as in claim 1, a plurality of wire rays, one or more of which is colored to correspond with each color of the visible spectrum which is to be represented in said model, the total number of such wire rays incorporated in said model being, preferably, some multiple of the number of colors being thus represented so as to provide equal numbers of wire rays of each color, the angular refractive bend of each of said wire rays being manually adjustable, by bending the said wire ray, so that the refractive angles of said wire rays may be made proportionately and progressively greater for each successive color, progressing from red through the various colors to violet in the order in which they naturally occur in the visible spectrum, thus rendering said demonstration model capable of demonstrating the principles of optical dispersion and chromatic abberation.

9. A demonstration model capable of visually presenting a three-dimensional, mechanical analogue illustration of the refraction of light rays as they are projected through an optical medium, comprising a negative, or diverging, type optical lens or representative model thereof, vertically mounted at its lower edge upon a vertical support which is fixed to a suitable base; a thin, stiff rectilinear wire or rod penetrating the center of said lens or model, rigidly fastened thereto, protruding substantially from opposite surfaces thereof and so disposed as to coincide with and represent the optical axis of said lens or model; a plurality of rectilinear ray slots perforating said lens or model, said ray slots being symmetrically distributed angularly about said optical axis with their major axes radially disposed thereto; a wire ray pivotally mounted within each of said ray slots so as to be capable of oscillation in a plane of said optical axis, each such wire ray protruding substantially from opposite surfaces of said lens or model, and each such ray being rectilinear throughout its length except for an angular bend which represents refraction at the point of said pivotal mounting, said angular refractive bend of each such wire ray so directed that the opposing lever arms of said wire ray diverge toward their extremities from said optical axis wire; and a light-weight, wheel-shaped control ring of outside diameter exceeding the diameter of the circle described by the said ray slots as located in said lens or model, the hub of said control ring being slidably mounted upon said optical axis wire, and loosely-fitting apertures, each so positioned at the periphery of said control ring as to be pierced by one arm of the wire ray mounted within a correspondingly positioned ray slot, so that manual sliding of said control ring longitudinally along said optical axis causes simultaneous and co-ordinated oscillation of all wire rays as bent levers to demonstrate visually the light ray patterns developed by a negative lens.

10. A demonstration model capable of visually presenting a three-dimensional, mechanical analogue illustration of the refraction of light rays as they are projected through an optical medium, comprising a triangular optical prism or representative model thereof; a rectilinear ray slot perforating said prism in a plane which is perpendicular to both the base and the longitudinal axis thereof; and a wire ray system piercing said prism through said ray slot wherein it is pivotally mounted and capable of being oscillated as a lever in said plane, opposing arms of said wire ray system protruding substantially beyond oppositely disposed refracting surfaces of said prism and enclosing between them, toward the base of said prism and in the said plane of oscillation, a large obtuse angle which represents refraction, one of said arms consisting of a single, thin, stiff rectilinear wire or rod of white color to represent an incident ray of white light and the opposing arm of said wire ray system comprising a plurality of similar wires or rods, all of which lie in said plane of oscillation, are joined proximally at or near the pivot point within said ray slot and diverge from each other distally at small acute angles as they emerge from said ray slot, said diverging wires or rods representing refracted and dispersed light rays and each being colored, respectively and progressively, beginning with that wire ray which forms the largest obtuse angle with the aforesaid white incident wire ray, one of the colors of light from red through violet in the order in which they naturally occur in the optical spectrum, the said wire ray system demonstrating a typical refraction and dispersion pattern for all angles of incidence as the incident white wire ray is manually oscillated throughout its range as one arm of a bent lever.

11. In an analogue demonstration model of the class described, a representative model of an optical instrument or of a section of such instrument, said model incorporating one or more optical refracting devices such as lenses or prisms, or models thereof, said optical refracting devices or models being mounted at representative locations within said instrument model, each of said refracting devices or models being perforated by one or more ray slots; a thin, stiff wire ray projecting through each of said ray slots, wherein it is pivotally mounted, said wire ray protruding substantially from opposite surfaces of said optical refracting device or model and being rectilinear throughout its length except for an angular bend at said pivotal mounting within said ray slot, the said angular bend portraying refraction of the light ray represented by said wire ray; and means for imparting oscillatory motion to said wire rays so as to demonstrate refraction principles involved in the operation of the optical instrument so represented.

12. In an analogue demonstration model of the class described, a rectangular box with one vertical side open to the observer's view so as to represent one half of a photographic camera which has been vertically sectioned at said vertical open side, substantially in the plane of said camera's optical axis, the two opposing vertical walls of said box adjacent to said plane of section representing, respectively, the front and rear walls of said camera; a substantially semi-tubular lens barrel mount fitted into a substantially semi-circular notch in the exposed edge of said front camera wall and immovably secured thereto, said barrel mount being so disposed that its longitudinal axis coincides with the optical axis of said camera and its interior, concave surface is disposed toward the observer; a substantially semi-tubular lens barrel of outside diameter substantially equal to the inside diameter of said lens barrel mount wherein said lens barrel is coaxially received, longitudinally slidable therein and retained therein by a vertical bar which is secured to the exposed edge of said front camera wall below said barrel mount and projects upward above the lower edge of said lens barrel so as to prevent rotation thereof; a rectangular notch in the aforementioned rear camera wall, said notch being symmetrically disposed about said optical axis to represent said camera's image plane and allow free movement of wire rays; and a demonstration positive lens model coaxially retained in said lens barrel, said lens model comprising a converging lens or model thereof perforated by a multiplicity of ray slots, each of said slots pivotally retaining a bent wire ray which projects therethrough, a rectilinear wire ray piercing the center of said lens or model, rigidly fastened thereto, protruding substantially from opposite surfaces thereof and so disposed as to coincide with and represent the optical axis of said lens or model, and a flexible, elastic focus ring surrounding and retaining all of said bent wire rays projecting forward of said camera model in a bundle at their point of convergence about and in contact with said optical axis wire ray, said focus ring representing an object point to be photographed, manual sliding of said focus ring to and fro along said axis wire ray establishing varying object distances and necessitating manual longitudinal sliding of said lens barrel within said barrel mount so as to converge the refracted wire rays at said image plane, as in focusing an actual camera.

13. In an analogue demonstration model of the class described, a hollow, oblate hemispheroid shell mounted upon a vertical support with its major axis horizontally disposed and with its exposed, elliptical edge in a vertical plane so as to expose its interior to the observer's view and represent one half of an eyeball which has been vertically sectioned in its median longitudinal plane, opposite ends of said eyeball model representing, respectively, the cornea and retinal wall of an eyeball, the edge of said model being recessed symmetrically about the optical axis of said eyeball at said retinal and corneal ends ends to permit free movement of wire rays; and a demonstration positive lens model coaxially retained within said eyeball model by mating grooves in internal protuberances within said eyeball model which are so shaped and disposed as to represent the lens suspensory ligaments of an eyeball, said lens model comprising a converging lens or model thereof perforated by a multiplicity of ray slots, each of said slots pivotally retaining a bent wire ray which projects therethrough a rectilinear wire ray piercing the center of said lens or model, rigidly fastened thereto, protruding substantially from opposite surfaces thereof and so disposed as to coincide with and represent the optical axis of said lens or model, and a flexible, elastic focus ring surrounding and retaining all of said bent wire rays projecting forward of said eyeball model in a bundle at their point of convergence about and in contact with said optical axis wire ray, said focus ring representing a visual object and capable of being manually slid to or fro along the axis wire of said lens model so as to cause convergence of the refracted rays therefrom at the retinal plane of said eyeball model, or elsewhere, as desired by the operator.

References Cited in the file of this patent

UNITED STATES PATENTS

| | | |
|---|---|---|
| 2,155,114 | Black | Apr. 18, 1939 |
| 2,529,107 | Shapiro | Nov. 7, 1950 |

FOREIGN PATENTS

| | | |
|---|---|---|
| 496,257 | Great Britain | Nov. 28, 1938 |

OTHER REFERENCES

Catalogue of Scientific Instruments, L. E. Knotts Apparatus Co., Boston, 1916 (copyright 1916). Page 242; Item No. 71–20.